US012723294B2

(12) United States Patent
Shinagawa et al.

(10) Patent No.: US 12,723,294 B2
(45) Date of Patent: Sep. 1, 2026

(54) SOFT MAGNETIC MATERIAL, METHOD FOR PRODUCING SOFT MAGNETIC MATERIAL, AND ELECTRIC MOTOR

(71) Applicant: Hitachi, Ltd., Tokyo (JP)

(72) Inventors: Kazuya Shinagawa, Tokyo (JP); Matahiro Komuro, Tokyo (JP); Yusuke Asari, Tokyo (JP); Shohei Terada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 541 days.

(21) Appl. No.: 18/019,897

(22) PCT Filed: Jun. 1, 2021

(86) PCT No.: PCT/JP2021/020774

§ 371 (c)(1),
(2) Date: Feb. 6, 2023

(87) PCT Pub. No.: WO2022/070508

PCT Pub. Date: Apr. 7, 2022

(65) Prior Publication Data

US 2023/0287546 A1 Sep. 14, 2023

(30) Foreign Application Priority Data

Sep. 30, 2020 (JP) ................................ 2020-164922

(51) Int. Cl.
*C22C 38/10* (2006.01)
*B22F 1/054* (2022.01)
*B22F 1/142* (2022.01)
*C21D 1/18* (2006.01)
*C21D 6/00* (2006.01)
*C21D 8/1244* (2026.01)
(Continued)

(52) U.S. Cl.
CPC ............ *C22C 38/105* (2013.01); *B22F 1/054* (2022.01); *B22F 1/142* (2022.01); *C21D 1/18* (2013.01);
(Continued)

(58) Field of Classification Search
CPC ... C22C 38/105; C22C 38/10; C22C 2202/02; B22F 1/054; B22F 1/142; B22F 2301/35;
(Continued)

(56) References Cited

U.S. PATENT DOCUMENTS

2014/0290434 A1 10/2014 Matthiesen
2016/0141082 A1 * 5/2016 Wang ..................... H01F 1/047 148/101
2017/0243680 A1 8/2017 Wang et al.
(Continued)

FOREIGN PATENT DOCUMENTS

JP 63-7332 A 1/1988
JP 3-244108 A 10/1991
(Continued)

OTHER PUBLICATIONS

Wetzel, M. H. et al. High-pressure high-temperature study of the pressure induced decomposition of the iron nitride gamma'-Fe4N. Journal of Alloys and Compounds. 807 pp. 438-448. (Year: 2019).*
(Continued)

*Primary Examiner* — Tima M. Mcguthry-Banks
(74) *Attorney, Agent, or Firm* — Crowell & Moring LLP

(57) ABSTRACT

Soft magnetic materials containing Fe and Co in a total amount of 90 mass % or more are provided herein. The soft magnetic materials contain 50 mass % or more of Fe, 40 mass % or less of Co, 0.1 mass % or less of C, 2.0 mass % or less of Ni, 0.2 mass % or less of Mn, Si, Cr, Ti, Nb, and V, and inevitable impurities; and a precipitate of a compound of iron and nitrogen. The precipitate is created by tension annealing a raw material of the soft magnetic material. Methods of producing the soft magnetic materials are further provided. Electric motors using the soft magnetic materials are further provided.

13 Claims, 4 Drawing Sheets

(51) Int. Cl.
*H01F 1/147* (2006.01)
*H01F 1/20* (2006.01)
*H02K 1/02* (2006.01)

(52) U.S. Cl.
CPC ............. *C21D 6/007* (2013.01); *C21D 8/125* (2013.01); *C21D 8/1255* (2013.01); *C22C 38/10* (2013.01); *H01F 1/147* (2013.01); *H01F 1/20* (2013.01); *H02K 1/02* (2013.01); *B22F 2301/35* (2013.01); *B22F 2302/20* (2013.01); *B22F 2304/054* (2013.01); *C22C 2202/02* (2013.01)

(58) Field of Classification Search
CPC .... B22F 2302/20; B22F 2304/54; C21D 1/18; C21D 6/007; C21D 8/125; C21D 8/1255; H01F 1/147; H01F 1/20; H02K 1/02
See application file for complete search history.

(56) References Cited

U.S. PATENT DOCUMENTS

| | | | |
|---|---|---|---|
| 2018/0025841 | A1 | 1/2018 | Wang et al. |
| 2022/0328225 | A1 | 10/2022 | Komuro et al. |

FOREIGN PATENT DOCUMENTS

| | | | | |
|---|---|---|---|---|
| JP | 6-267722 | A | 9/1994 | |
| JP | 2001-176715 | A | 6/2001 | |
| JP | 2007-46074 | A | 2/2007 | |
| JP | 2015-507354 | A | 3/2015 | |
| JP | 2017-530547 | A | 10/2017 | |
| JP | 2018-509756 | A | 4/2018 | |
| WO | WO-2018204800 | A1 * | 11/2018 | ......... H01F 41/0253 |
| WO | WO 2021/131162 | A1 | 7/2021 | |

OTHER PUBLICATIONS

International Search Report (PCT/ISA/210) issued in PCT Application No. PCT/JP2021/020774 dated Aug. 31, 2021 with English translation (five (5) pages).

Japanese-language Written Opinion (PCT/ISA/237) issued in PCT Application No. PCT/JP2021/020774 dated Aug. 31, 2021 (five (5) pages).

* cited by examiner

PRIOR ART

SOFT MAGNETIC MATERIAL, METHOD FOR PRODUCING SOFT MAGNETIC MATERIAL, AND ELECTRIC MOTOR

TECHNICAL FIELD

The present invention relates to a soft magnetic material, a method for producing a soft magnetic material, and an electric motor.

BACKGROUND ART

A material having the highest saturation magnetic flux density among bulk alloys is a FeCo-based alloy. Since the cost of Co to be used as an alloy element is high, an element replacing Co has been desired as an element constituting the material. Fe-based martensite is a material that exhibits, in a thin film, a saturation magnetic flux density (hereinafter, abbreviated as Bs) equivalent to that of a FeCo alloy. It is known that a thin film or foil containing, among Fe-based martensite, $Fe_{16}N_2$ as a main component has Bs more than 2.4 T.

PTL 1 discloses a method for producing an ordered martensitic iron nitride powder. PTL 2 discloses a magnetic material in which a part of N (nitrogen) in $Fe_{16}N_2$ is replaced by at least one of C, B, or O. PTL 3 discloses metal fine particles containing Fe as a main component and coated with graphite. PTL 4 discloses a high saturation magnetization Fe—N-based magnetic material composed of a mixed phase of an α-Fe-phase and a $Fe_{16}N_2$-phase.

CITATION LIST

Patent Literature

PTL 1: JP 2015-507354 A
PTL 2: JP 2017-530547 A
PTL 3: JP 2007-046074 A
PTL 4: JP 2001-176715 A

SUMMARY OF INVENTION

Technical Problem

However, when Co in a FeCo-based alloy is replaced by another element, there is a problem that a saturation magnetic flux density decreases as well as a reduction in Co.

Therefore, an object of the present invention is to provide a soft magnetic material capable of achieving a high saturation density by reducing Co among soft magnetic materials made of a FeCo-based alloy, and a method for producing a soft magnetic material. Another object is to provide an electric motor using the soft magnetic material of the present invention.

Solution to Problem

One aspect of the soft magnetic material of the present invention is a soft magnetic material containing Fe and Co in a total amount of 90 mass % or more, in which: contained components are 50 mass % or more of Fe, 40 mass % or less of Co, 0.1 mass % or less of C, 2.0 mass % or less of Ni, 0.2 mass % or less of Mn, Si, Cr, Ti, Nb, and V, and inevitable impurities; and the soft magnetic material contains a precipitate of a compound of iron and nitrogen.

In addition, one aspect of the method for producing a soft magnetic material of the present invention is a method for producing a soft magnetic material, including: a nitrogen introduction/diffusion heat treatment step of subjecting a soft magnetic material raw material containing Fe and Co in a total amount of 90 mass % or more to a heat treatment in a nitrogen atmosphere; a cooling step of rapidly cooling the soft magnetic material raw material that has undergone the nitrogen introduction/diffusion heat treatment step; and a tension annealing step of annealing the soft magnetic material raw material after the cooling step while applying a tensile stress.

In addition, the electric motor of the present invention is an electric motor using the soft magnetic material.

A more specific configuration of the present invention is described in the claims.

Advantageous Effects of Invention

According to the present invention, it is possible to provide a soft magnetic material capable of achieving a high saturation density by reducing Co among soft magnetic materials made of a FeCo-based alloy, a method for producing a soft magnetic material, and an electric motor.

Problems, configurations, and advantageous effects other than those described above will be clarified by the following description of embodiments.

DESCRIPTION OF EMBODIMENTS

Figure 1:
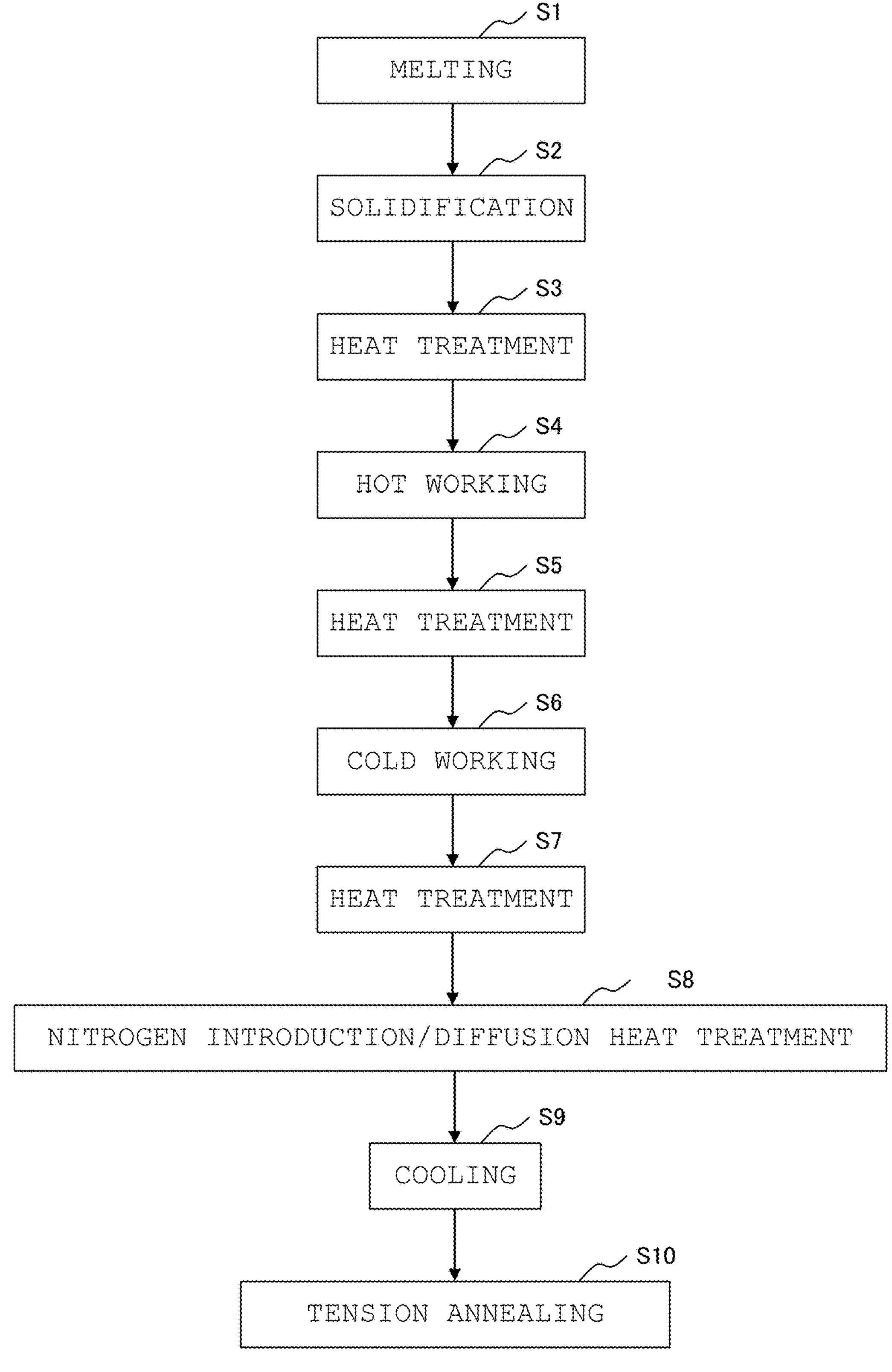
FIG. 1 is a flowchart showing an example of a method for producing a soft magnetic material of the present invention.

As described above, the soft magnetic material of the present invention is a soft magnetic material containing Fe and Co in a total amount of 90 mass % or more, in which: contained components are 50 mass % or more of Fe, 40 mass % or less of Co, 0.1 mass % or less of C, 2.0 mass % or less of Ni, 0.2 mass % or less of Mn, Si, Cr, Ti, Nb, and V, and inevitable impurities; and the soft magnetic material contains a precipitate of a compound of iron and nitrogen. This precipitate contains $Fe_{16}N_2$ or $Fe_8N$ that develop a high saturation magnetic flux density. Such a nitride precipitate is obtained by tension annealing a FeCo alloy.

In the soft magnetic material, the volume ratio of a γ-phase with a face-centered cubic crystal is desirably 5% or less. Since the γ-phase is nonmagnetic, a magnetic flux density decreases due to an increase in the volume ratio of this phase.

Examples of a method for preventing an increase in the γ-phase include production of a material having the above composition range and transformation of the γ-phase created in the production process into an α-phase or an α'-phase having a high saturation magnetic flux density. Examples of the production method include a sub-zero treatment in which, in cooling after a heat treatment for introducing nitrogen into a material, the material is immersed in liquid nitrogen and rapidly cooled.

In addition, a method for decomposing into an α-phase and an α'-phase, and a $Fe_8N$- or $Fe_{16}N$-phase having a high saturation magnetic flux density is also effective, the decomposing being achieved by a tempering treatment under a condition in which no nitride $Fe_4N$ having a low saturation magnetic flux density and a face-centered cubic structure, which will be described later, is created after cooling.

Examples of the Fe nitride include $Fe_8N$ or $Fe_{16}N_2$ having a high saturation magnetic flux density and $Fe_4N$ having a low saturation magnetic flux density. In order to realize a high saturation magnetic flux density, it is necessary to prevent $Fe_4N$ from being created. For this purpose, it is necessary to cool the material at a sufficiently high rate in the cooling process carried out after the heat treatment for introducing nitrogen. This is because if the cooling rate is insufficient, nitrogen atoms diffuse and bond with Fe, leading to creation of $Fe_4N$.

Examples of a method for increasing the creation of $Fe_8N$ or $Fe_{16}N_2$ having a high saturation magnetic flux density include a tempering treatment under appropriate conditions after cooling. Although the conditions suitable for the creation of $Fe_8N$ or $Fe_{16}N_2$ are unclear in many respects, it is desirable that it is an α-phase or α'-phase obtained in a concentration range of the nitrogen of 0.01 to 1.2 mass % and at a sufficient cooling rate. This is because many dislocations are introduced and a highly strained state is created in the α'-phase, nucleation is easy and even at a low tempering temperature, a large amount of $Fe_8N$ or $Fe_{16}N_2$ can be created in a short time. This strain is not limited to what is created by cooling and phase transformation, but may be one that is introduced from the outside by tension or compression.

Hereinafter, the soft magnetic material of the present invention and the method for producing the same will be described in detail with reference to the drawings.

[Components Contained in Soft Magnetic Material]

First, components contained in the soft magnetic material of the present invention described above will be described.

Fe (Iron): 50 Mass % or More

Fe is an element to serve as a base of the soft magnetic material. In order to realize a saturation magnetic flux density of 2.2 T or more of the soft magnetic material, an α-phase with a body-centered cubic structure, an α' with a body-centered square structure, and $Fe_8N$ and $Fe_{16}N$ nitrides are required, and therefore the content is desirably 50 mass % or more that is sufficient to create these.

Co (Cobalt): 40 Mass % or Less

Co is an element to serve as a base of the soft magnetic material together with Fe, and the total content of Fe and Co is preferably 90 mass %. Co has an effect of improving the saturation magnetic flux density as the addition amount thereof increases, but the cost of the material is increased at the same time, and there is also a problem that, in a treatment for introducing nitrogen at a high temperature in the production method to be described later, the introduction amount of nitrogen is decreased. Therefore, the content is desirably 40 mass % or less. The content is more preferably 30 mass % or less, and particularly preferably 25 mass % or less.

N (Nitrogen): 1.2 Mass % or Less

As the concentration of N increases, it increases the amount of nitride such as $Fe_8N$ or $Fe_{16}N_2$ that increase the high saturation magnetic flux density. On the other hand, a nonmagnetic γ-phase is stabilized with an increase in N, and γ is less likely to be transformed into α or α' in a sub-zero treatment during or after cooling in the production method to be described later, or in the subsequent tension annealing.

Furthermore, there is also a problem that $Fe_4N$ that decreases magnetic characteristics is likely to precipitate, so that the content is desirably 1.2 mass % or less. The lower limit value is not particularly limited as long as a concentration, at which the precipitation amount of $Fe_8N$ or $Fe_{16}N$ nitride necessary for the saturation magnetic flux density to be 2.2 T or more is secured, can be maintained. The concentration at this time is determined, in the production method to be described later, depending on the condition of introducing and diffusing nitrogen into the material and the condition of the tension annealing.

C: 0.1 Mass % or Less

As the concentration of C increases, it promotes stabilization of a nonmagnetic γ-phase and precipitation of $Fe_3C$ carbide having low magnetic characteristics and reduces a saturation magnetic flux density. Therefore, C is desirably reduced as much as possible, and the content is desirably reduced to 0.1 mass % or less.

Ni: 2.0 Mass % or Less

Ni has an effect of improving the saturation magnetic flux density as the concentration increases, but the cost of the material is increased at the same time, and there is also a problem that, in the treatment for introducing nitrogen at a high temperature in the production method to be described later, the introduction amount of nitrogen is decreased. Therefore, the content is desirably 2.0 mass % or less.

Mn, Si, Cr, Ti, Nb, V: 0 or 0 to 0.2 Mass % or Less

Each of Mn, Si, Cr, Ti, Nb, and V decreases the saturation magnetic flux density, and when bonded with N, it precipitates nitride having low magnetic characteristics. Therefore, the content is desirably 0 or 0.2 mass % or less.

[Soft Magnetic Material]

The soft magnetic material raw material having the above components creates the soft magnetic material of the present invention through the production method of the present invention that will be described later. The soft magnetic material of the present invention precipitates a compound of Fe and nitrogen in the course of the production method. This precipitate is mainly granular, and has an average particle size of from 2 nm to 20 nm (inclusive) and a number density of 100 particles/$\mu cm^2$ or more. The average particle size and number density can be analyzed by a transmission electron microscope (TEM).

[Method for Producing Soft Magnetic Material]

FIG. 1 is a flowchart showing an example of the method for producing a soft magnetic material of the present invention. As shown in FIG. 1, the method for producing a soft magnetic material of the present invention includes a melting step (S1), a solidification step (S2), a heat treatment step (S3), a hot working step (S4), a heat treatment step (S5), a cold working step (S6), a heat treatment step (S7), a nitrogen introduction/diffusion heat treatment step (S8), a cooling step (S9), and a tension annealing step (S10).

In the melting step (S1), materials, containing elements constituting the soft magnetic material of the present invention described above, are mixed and melted to obtain a molten material. In the solidification step (S2), the molten material obtained in the melting step (S1) is solidified to obtain a solidified product. In the heat treatment step (S3), the solidified product obtained in the solidification step (S2) is subjected to a heat treatment at a temperature lower than the melting point. In the hot working step (S4), the solidified product is rolled and molded to a predetermined size while the high temperature in the heat treatment in the heat treatment step (S3) is maintained, so that the composition and structure are homogenized. In the heat treatment step (S5), the strain and work structure after hot working are removed to homogenize the structure. In the cold working step (S6), the product is molded to have a required thickness by cold working. In the heat treatment step (S7), the strain and work structure after hot working are removed to homogenize the structure.

In the production flow so far, the form and concentration of the Fe-containing material, and various conditions in each of the melting step, the solidification step, and the various heat treatment steps are not particularly limited.

The nitrogen introduction/diffusion heat treatment step (S8) is a step of introducing and diffusing necessary nitrogen into the material, and is preferably performed at from 600° C. to 1200° C. (inclusive) for 24 hours or less. In the cooling step (S9), the material after the nitrogen introduction/diffusion heat treatment step (S8) is cooled. The cooling step is preferably performed at a cooling rate of less than 100° C./s. The tension annealing step (S10) is a step of performing a heat treatment, while applying a stress such as tension or compression, to precipitate a compound of Fe and N such as $Fe_8N$ or $Fe_{16}N_2$. Under the conditions, it is preferable that the temperature is from 100° C. to 200° C. (inclusive), the retention time is 24 hours or less, and the tensile stress is 10.197 kgf/mm$^2$ (100 MPa).

[Electric Motor]

The soft magnetic material of the present invention can be applied to various magnetic circuits. When applied to an electric motor, it is possible to provide an electric motor having a high saturation magnetic flux density and a high torque while it is at a low cost and with a small size.

EXAMPLES

Hereinafter, the effects of the present invention will be demonstrated on the basis of experimental results.

Example 1

A material was obtained by molding a melt, containing 20 mass % of Co and the balance composed of Fe and inevitable impurities, to a thickness of 0.1 mm through a hot working step (hot rolling) and a cold working step.

This material was heated to 900° C., which is within the austenite (γ) formation temperature range, at a heating rate of 10° C./min, and $NH_3$ was supplied until an ammonia ($NH_3$) nitrogen atmosphere of $1\times10^5$ Pa was obtained. After the nitrogen concentration was reached to a concentration necessary for $Fe_8N$ to achieve a saturation magnetic flux density of 2.2 T, the material was quenched in water and rapidly cooled. In this process, the material is transformed from γ to α', and what has not been completely transformed remains as γ. Thereafter, a tensile stress within a range of 1-20 kgf/mm$^2$ was applied in the longitudinal direction of an iron foil while it was held at 200° C. to precipitate $Fe_8N$ nitride having a high magnetic flux density, thereby obtaining a soft magnetic material of Example 1.

The composition of the obtained soft magnetic material was analyzed by an EPMA (Electron Probe Micro Analyzer), to find that Fe was 50 mass %, Co 40 mass %, C 0.1 mass %, Ni 2.0 mass %, Mn 0.2 mass %, Si 0.2 mass %, Cr 0.2 mass %, Ti 0.2 mass %, Nb 0.2 mass %, and V 0.2 mass %.

Figure 2:
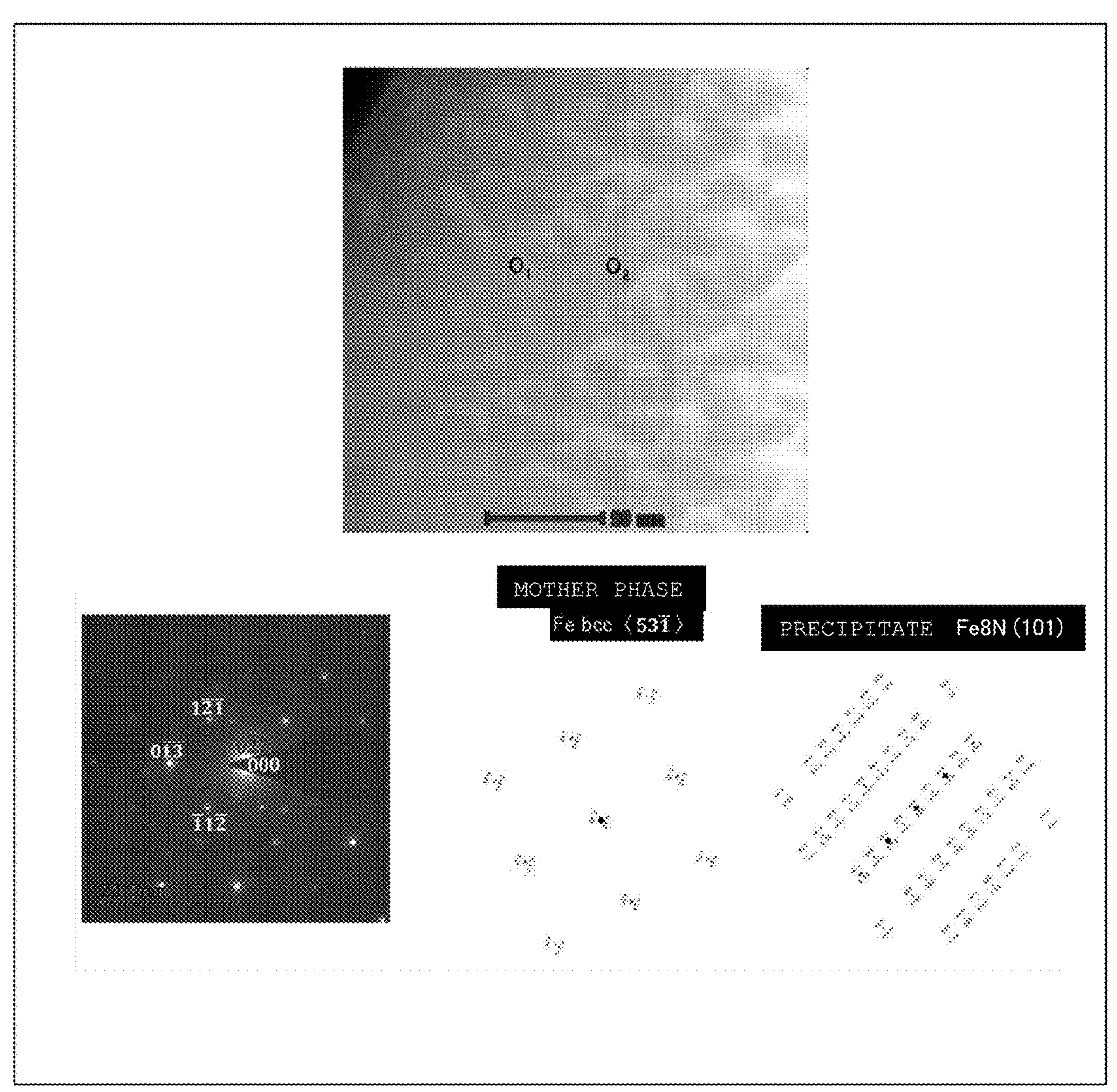
FIG. 2 shows a TEM observation photograph and an electron diffraction pattern of a soft magnetic material of Example 1.

FIG. 2 shows a TEM (Transmission Electron Microscope) observation photograph and an electron diffraction pattern of the soft magnetic material of Example 1. In the soft magnetic material of Example 1, it was confirmed that $Fe_8N$ precipitated on Fe in the mother phase, as shown in FIG. 2.

The volume ratio of the remaining γ-phase of the soft magnetic material of Example 1 was calculated by determining the ratio of the fcc diffraction pattern included in the pattern obtained by X-ray diffraction (XRD) measurement (Mo—$K_\alpha$ ray). As a result, it was 4%.

In addition, the saturation magnetic flux density at 20° C. was measured by a vibrating sample magnetometer (VSM). As a result, it was 2.4 T. It was confirmed that the saturation magnetic flux density exceeded 2.1 T that is the saturation magnetic flux density of a pure iron foil and it was equivalent to the saturation magnetic flux density of a commercially available material $Fe_{50}Co$ permendur (saturation magnetic flux density: T).

Example 2

A material was obtained by molding a melt, containing Fe and inevitable impurities, to a thickness of 0.1 mm through a hot working step (hot rolling) and a cold working step.

This material was heated to 900° C., which is within the austenite (γ) formation temperature range, at a heating rate of 10° C./min, and $NH_3$ was supplied until an ammonia ($NH_3$) nitrogen atmosphere of $1\times10^5$ Pa was obtained. After the nitrogen concentration was reached to 1.2 mass %, the material was quenched in water and rapidly cooled. In this process, the material is transformed from γ to α', and what has not been completely transformed remains as γ. Thereafter, a tensile stress within a range of 1-20 kgf/mm$^2$ was applied in the longitudinal direction of an iron foil while it was held at 200° C. to precipitate $Fe_8N$ and $Fe_{16}N$ nitrides having a high magnetic flux density, thereby obtaining a soft magnetic material of Example 2.

The composition of the obtained soft magnetic material was analyzed by an EPMA (Electron Probe Micro Analyzer), to find that Fe was 50 mass %, Co 40 mass %, C 0.1 mass %, Ni 2.0 mass %, Mn 0.2 mass %, Si 0.2 mass %, Cr 0.2 mass %, Ti 0.2 mass %, Nb 0.2 mass %, and V 0.2 mass %.

The volume ratio of the remaining γ-phase of the soft magnetic material of Example 2 was calculated by determining the ratio of the fcc diffraction pattern included in the pattern obtained by X-ray diffraction (XRD) measurement (Mo—$K_\alpha$ ray). As a result, it was 4%.

In addition, the saturation magnetic flux density at 20° C. was measured by a VSM. As a result, it was 2.2 T. It was confirmed that the saturation magnetic flux density exceeded 2.1 T that is the saturation magnetic flux density of a pure iron foil and it was equivalent to the saturation magnetic flux density of a commercially available material $Fe_{50}Co$ permendur (saturation magnetic flux density: T).

Example 3

A material was obtained by molding a melt, containing 40 mass % of Co, 0.1 mass % of C, 2.0 mass % of Ni, 0.2 mass % of each of Mn, Si, Cr, Ti, Nb, and V, and the balance composed of Fe and inevitable impurities, to a thickness of 0.1 mm through a hot working step (hot rolling) and a cold working step.

This material was heated to 900° C., which is within the austenite formation temperature range, at a heating rate of 10° C./min, and $NH_3$ was supplied until an ammonia ($NH_3$) nitrogen atmosphere of $1\times10^5$ Pa was obtained. After the nitrogen concentration was reached to a concentration necessary for $Fe_8N$ to achieve a saturation magnetic flux density of 2.2 T, the material was quenched in water and rapidly cooled. In this process, the material is transformed from γ to α', and what has not been completely transformed remains as γ. Thereafter, a tensile stress within a range of 1-20 $kgf/mm^2$ was applied in the longitudinal direction of an iron foil while it was held at 200° C. to precipitate $Fe_8N$ and $Fe_{16}N$ nitrides having a high magnetic flux density, thereby obtaining a soft magnetic material of Example 3.

The composition of the obtained soft magnetic material was analyzed by an EPMA (Electron Probe Micro Analyzer), to find that Fe was 50 mass %, Co 40 mass %, C 0.1 mass %, Ni 2.0 mass %, Mn 0.2 mass %, Si 0.2 mass %, Cr 0.2 mass %, Ti 0.2 mass %, Nb 0.2 mass %, and V 0.2 mass %.

The volume ratio of the remaining γ-phase of the soft magnetic material of Example 3 was calculated by determining the ratio of the fcc diffraction pattern included in the pattern obtained by X-ray diffraction (XRD) measurement (Mo—$K_\alpha$ ray). As a result, it was 2%.

TEM observation of the soft magnetic material of Example 3 confirmed that $Fe_8N$ and $Fe_{16}N$ precipitated.

In addition, the saturation magnetic flux density at 20° C. was measured by a VSM. As a result, it was 2.4 T. It was confirmed that the saturation magnetic flux density exceeded 2.1 T that is the saturation magnetic flux density of a pure iron foil and it was equivalent to the saturation magnetic flux density of a commercially available material $Fe_{50}Co$ permendur (saturation magnetic flux density: T).

Comparative Example 1

A material was obtained by molding a melt, containing 40 mass % of Co, 2.0 mass % of Ni, 0.15 mass % of C, 0.1 mass % of each of Mn, Si, Cr, Ti, Nb, and V, and the balance composed of Fe and inevitable impurities, to a thickness of 0.1 mm through a hot working step (hot rolling) and a cold working step.

This material was heated to 900° C., which is within the austenite (γ) formation temperature range, at a heating rate of 10° C./min, and $NH_3$ was supplied until an ammonia ($NH_3$) nitrogen atmosphere of $1\times10^5$ Pa was obtained. After the nitrogen concentration was reached to a concentration necessary for $Fe_8N$ to achieve a saturation magnetic flux density of 2.2 T, the material was quenched in water and rapidly cooled. In this process, the material is transformed from γ to α', and what has not been completely transformed remains as γ. Thereafter, a tensile stress within a range of 1-20 $kgf/mm^2$ was applied in the longitudinal direction of an iron foil while it was held at 200° C. to precipitate $Fe_8N$ and $Fe_{16}N$ nitrides having a high magnetic flux density, thereby obtaining a soft magnetic material of Comparative Example 1.

The composition of the obtained soft magnetic material was analyzed by an EPMA (Electron Probe Micro Analyzer), to find that Fe was 50 mass %, Co 40 mass %, C 0.15 mass %, Ni 2.0 mass %, Mn 0.2 mass %, Si 0.2 mass %, Cr 0.2 mass %, Ti 0.2 mass %, Nb 0.2 mass %, and V 0.2 mass %, in which the content of C did not meet the range of the present invention (0.1 mass % or less).

The volume ratio of the remaining γ-phase of the soft magnetic material of Comparative Example 1 was calculated by determining the ratio of the fcc diffraction pattern included in the pattern obtained by X-ray diffraction (XRD) measurement (Mo—$K_\alpha$ ray). As a result, it was 4%.

In addition, precipitation of $Fe_8N$ and $Fe_{16}N$ was confirmed by transmission electron microscope observation, but precipitation of $Fe_3C$ carbide having low magnetic characteristics was also confirmed.

The saturation magnetic flux density at 20° C. was measured by a VSM. As a result, it was 2.18 T, which could not achieve 2.2 T.

Comparative Example 2

A material was obtained by molding a melt, containing 40 mass % of Co, 2.0 mass % of Ni, 0.1 mass % of C, 0.1 mass % of each of Mn, Si, Cr, Ti, Nb, and V, and the balance composed of Fe and inevitable impurities, to a thickness of 0.1 mm through a hot working step (hot rolling) and a cold working step.

This material was heated to 900° C., which is within the austenite (γ) formation temperature range, at a heating rate of 10° C./min, and $NH_3$ was supplied until an ammonia ($NH_3$) nitrogen atmosphere of $1\times10^5$ Pa was obtained. After the nitrogen concentration was reached to 1.4 mass %, the material was quenched in water and rapidly cooled. In this process, what has not been completely transformed from γ to α' remains as γ. Thereafter, a tensile stress within a range of 1-20 $kgf/mm^2$ was applied in the longitudinal direction of an iron foil while it was held at 200° C. to precipitate $Fe_8N$ and $Fe_{16}N$ nitrides having a high magnetic flux density, thereby obtaining a soft magnetic material of Comparative Example 2.

The composition of the obtained soft magnetic material was analyzed by an EPMA (Electron Probe Micro Analyzer), to find that Fe was 50 mass %, Co 40 mass %, C 0.1 mass %, Ni 2.0 mass %, Mn 0.2 mass %, Si 0.2 mass %, Cr 0.2 mass %, Ti 0.2 mass %, Nb 0.2 mass %, and V 0.2 mass %.

The volume ratio of the remaining γ-phase of the soft magnetic material of Comparative Example 2 was calculated by determining the ratio of the fcc diffraction pattern included in the pattern obtained by X-ray diffraction (XRD) measurement (Mo—$K_\alpha$ ray). As a result, it was 10%.

In addition, the saturation magnetic flux density at 20° C. was measured by a VSM. As a result, it was 2.09 T, which could not achieve 2.2 T.

Comparative Example 3

A material, obtained by molding a melt composed of Fe and inevitable impurities to a thickness of 0.1 mm through a hot working step (hot rolling) and a cold working step, was heated to 900° C., which is within the austenite (γ) forming temperature range, at a heating rate of 10° C./min, and $NH_3$ was supplied until an ammonia ($NH_3$) nitrogen atmosphere of $1\times10^5$ Pa was obtained. After the nitrogen concentration was reached to 1.2 mass %, the material was cooled with $N_2$ gas. In this process, the material was transformed from γ to α', what had not been completely transformed remained as γ, and further $Fe_4N$ nitride was created by diffusion transformation. Thereafter, a tensile stress within a range of 1-20 $kgf/mm^2$ was applied in the longitudinal direction of an iron foil while it was held at 200° C. to precipitate $Fe_8N$ and $Fe_{16}N$ nitrides having a high magnetic flux density, thereby obtaining a soft magnetic material of Example 3. The soft magnetic material of Comparative Example 3 was not cooled rapidly after the introduction of nitrogen.

The composition of the obtained soft magnetic material was analyzed by an EPMA (Electron Probe Micro Analyzer), to find that Fe was 50 mass %, Co 40 mass %, C 0.1 mass %, Ni 2.0 mass %, Mn 0.2 mass %, Si 0.2 mass %, Cr 0.2 mass %, Ti 0.2 mass %, Nb 0.2 mass %, and V 0.2 mass %.

Figure 3:
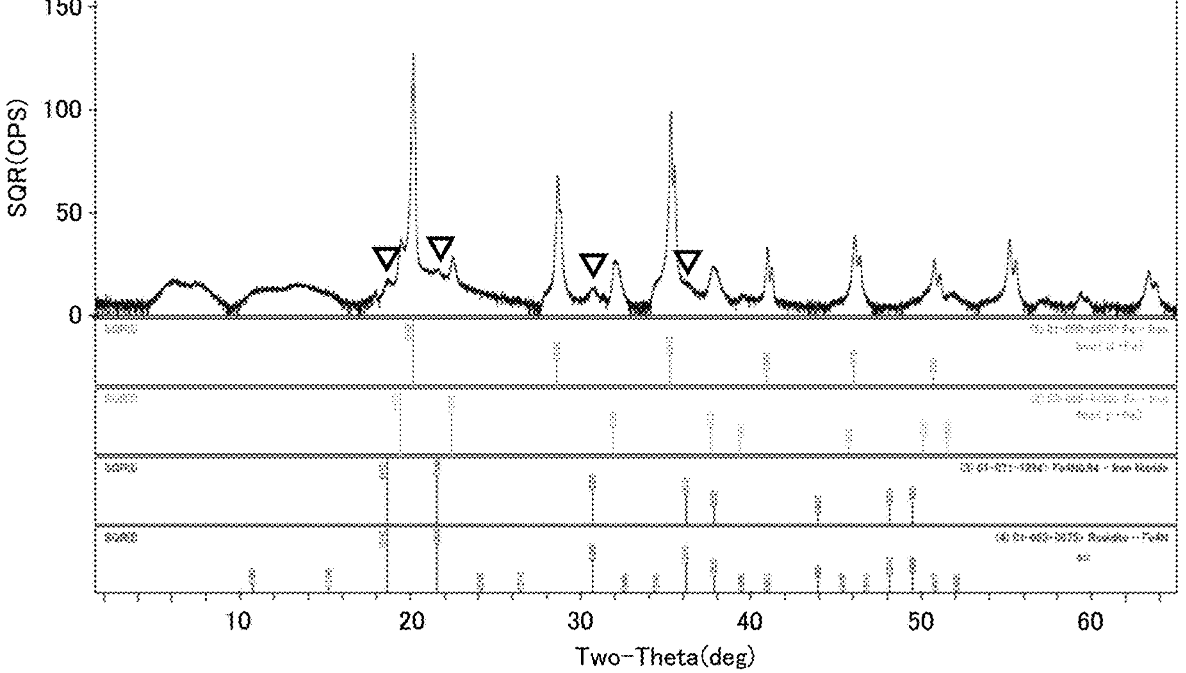
FIG. 3 is an XRD diffraction pattern of a soft magnetic material of Comparative Example 3.

FIG. 3 is an XRD diffraction pattern of the soft magnetic material of Comparative Example 3. From a pattern obtained by X-ray diffraction (XRD) measurement (Mo—$K_\alpha$ ray) of the soft magnetic material of Comparative Example 3, it was confirmed that a $Fe_4N$ nitride having low magnetic characteristics precipitated.

In addition, the saturation magnetic flux density at 20° C. was measured by a VSM. As a result, it was 1.89 T, which could not achieve 2.2 T.

Comparative Example 4

A material was obtained by molding a melt, containing 40 wt % of Co, 2.0 mass % of Ni, 0.1 mass % of C, 0.1 mass % of each of Mn, Si, Cr, Ti, Nb, and V, and the balance composed of Fe and inevitable impurities, to a thickness of 0.1 mm through a hot working step (hot rolling) and a cold working step. The material was heated to 900° C., which is within the austenite (γ) forming temperature range, at a heating rate of 10° C./min, and $NH_3$ was supplied until an ammonia ($NH_3$) nitrogen atmosphere of $1\times10^5$ Pa was obtained. After the nitrogen concentration was reached to a concentration necessary for $Fe_8N$ to achieve a saturation magnetic flux density of 2.2 T, the material was quenched in water and rapidly cooled. In this process, the material is transformed from γ to α', and what has not been completely transformed remains as γ. Thereafter, the tension annealing step was not performed, and a soft magnetic material of Comparative Example 4 was obtained.

The composition of the obtained soft magnetic material was analyzed by an EPMA (Electron Probe Micro Analyzer), to find that Fe was 50 mass %, Co 40 mass %, C 0.1 mass %, Ni 2.0 mass %, Mn 0.2 mass %, Si 0.2 mass %, Cr 0.2 mass %, Ti 0.2 mass %, Nb 0.2 mass %, and V 0.2 mass %.

The volume ratio of the remaining γ-phase of the soft magnetic material of Comparative Example 4 was calculated by determining the ratio of the fcc diffraction pattern included in the pattern obtained by X-ray diffraction (XRD) measurement (Mo—$K_\alpha$ ray). As a result, it was 6%.

Figure 4:
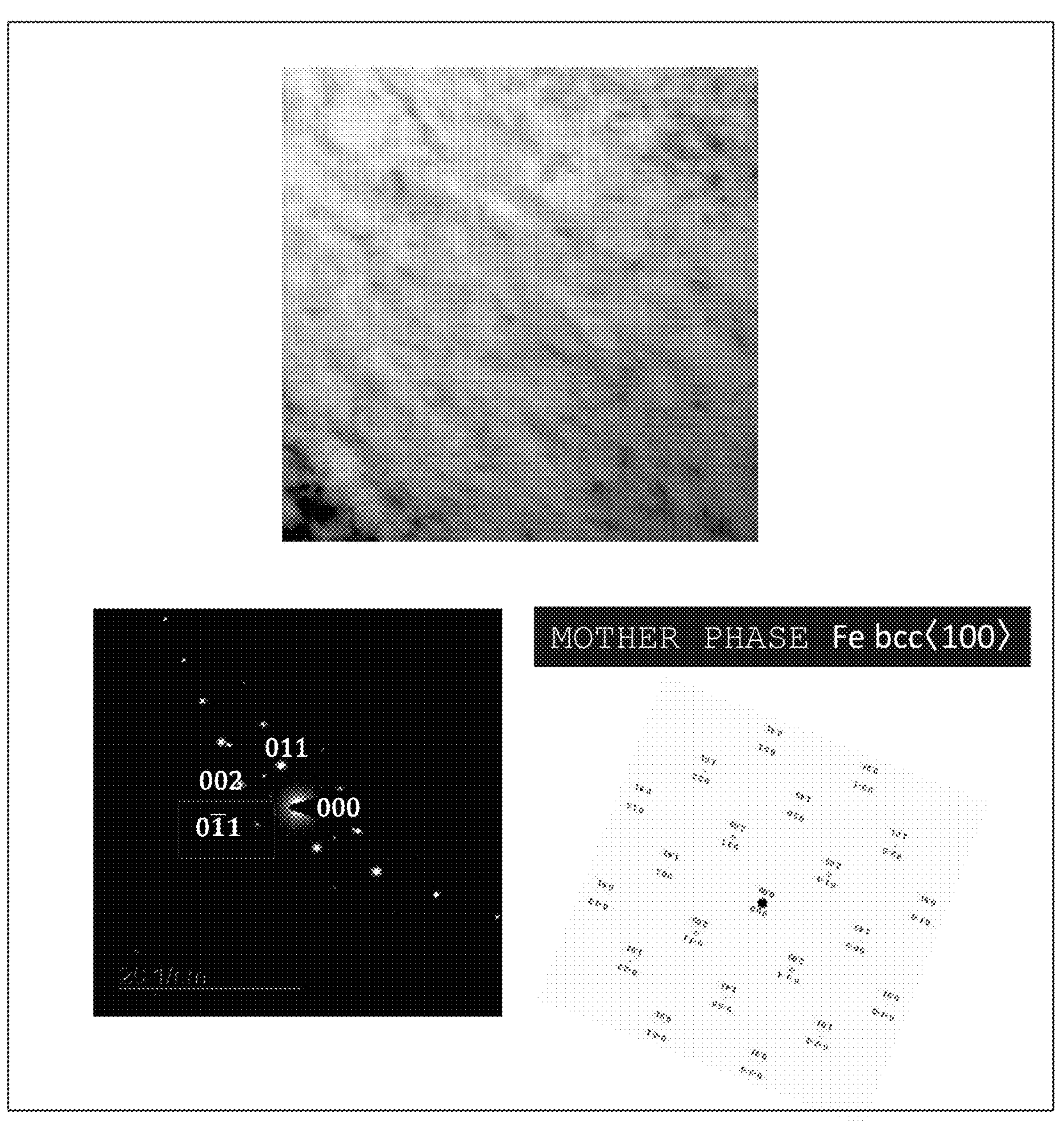
FIG. 4 is a TEM observation photograph and an electron diffraction pattern of a soft magnetic material of Comparative Example 4.

FIG. 4 is a TEM observation photograph and an electron diffraction pattern of the soft magnetic material of Comparative Example 4. As shown in FIG. 4, precipitation of $Fe_8N$ and $Fe_{16}N$ could not be confirmed in the soft magnetic material of Comparative Example 4.

In addition, the saturation magnetic flux density at 20° C. was measured by a VSM. As a result, it was 2.18 T, which could not achieve 2.2 T.

The compositions, heat treatment conditions, cooling rates, tension annealing conditions, and saturation magnetic flux densities for Examples 1 to 3 and Comparative Examples 1 to 4 are shown in Table 1. ○ indicates that it is within the range of the present invention, and x indicates that it is outside the range of the present invention.

TABLE 1

| | Composition | Heat Treatment Condition | Cooling rate | Tension annealing | Saturation magnetic flux density |
|---|---|---|---|---|---|
| Example 1 | ○ | ○ | ○ | ○ | 2.4 T |
| Example 2 | ○ | ○ | ○ | ○ | 2.2 T |
| Example 3 | ○ | ○ | ○ | ○ | 2.4 |
| Comparative Example 1 | X | ○ | ○ | ○ | 2.18 T |

TABLE 1-continued

| | Composition | Heat Treatment Condition | Cooling rate | Tension annealing | Saturation magnetic flux density |
|---|---|---|---|---|---|
| Comparative Example 2 | ○ | X | ○ | ○ | 2.09 T |
| Comparative Example 3 | ○ | ○ | X | ○ | 1.8 T |
| Comparative Example 4 | ○ | ○ | ○ | X | 2.1 T |

From Table 1, Examples 1 to 3 meeting the conditions of the present invention achieve a saturation magnetic flux density of 2.2 T or more.

According to the present invention, it has been demonstrated that it is possible to provide a soft magnetic material capable of achieving a high saturation density by reducing Co among soft magnetic materials made of a FeCo-based alloy, a method for producing a soft magnetic material, and an electric motor, as described above.

The present invention is not limited to the above embodiments, and includes various modifications.

For example, the above embodiments have been described in detail for easy understanding of the present invention, and they are not necessarily limited to those including all the configurations described above. In addition, a part of the configuration of a certain embodiment can be replaced with the configuration of another embodiment, or the configuration of a certain embodiment can be added with the configuration of another embodiment. In addition, a part of the configuration of each embodiment can be added, deleted, or replaced for another configuration.

The invention claimed is:

1. A soft magnetic material comprising Fe and Co in a total amount of 90 mass % or more, wherein:
- contained components are 50 mass % or more of Fe, 40 mass % or less of Co, 0.1 mass % or less of C, 2.0 mass % or less of Ni, 0.2 mass % or less of Mn, Si, Cr, Ti, Nb, and V, and inevitable impurities;
- the soft magnetic material comprises a precipitate of a compound of iron and nitrogen; and
- wherein a volume ratio of face-centered cubic crystals contained in the soft magnetic material is from 2% to 5%.

2. The soft magnetic material according to claim 1, wherein the precipitate is $Fe_{16}N_2$ or $Fe_8N$.

3. The soft magnetic material according to claim 1, wherein an average particle size of the precipitate is 2 to 20 nm.

4. The soft magnetic material according to claim 1, wherein a number density of the precipitates is 100 particles/$\mu m^2$ or more.

5. The soft magnetic material according to claim 1, wherein a saturation magnetic flux density, at 20° C., of the soft magnetic material is 2.2 T or more.

6. A method for producing the soft magnetic material according to claim 1, comprising:
- subjecting a soft magnetic material raw material containing Fe and Co in a total amount of 90 mass % or more to a heat treatment in a nitrogen atmosphere;
- rapidly cooling the soft magnetic material raw material that has undergone the subjecting; and
- annealing the soft magnetic material raw material after the rapidly cooling while applying a tensile stress to provide the soft magnetic material;

wherein the volume ratio of face-centered cubic crystals contained in the soft magnetic material after the annealing is from 2% to 5%.

7. An electric motor having a high saturation magnetic flux density of 2.2 T or more, comprising magnetic circuits made with the soft magnetic material according to claim 1.

8. A method for producing a soft magnetic material, comprising:

subjecting a soft magnetic material raw material containing Fe and Co in a total amount of 90 mass % or more to a heat treatment in a nitrogen atmosphere;

rapidly cooling the soft magnetic material raw material that has undergone the subjecting; and annealing the soft magnetic material raw material after the rapidly cooling while applying a tensile stress to provide the soft magnetic material;

wherein a volume ratio of face-centered cubic crystals contained in the soft magnetic material after the annealing is from 2% to 5%.

9. The method according to claim 8, wherein a compound of iron and nitrogen is precipitated in the soft magnetic material raw material by the annealing.

10. The method according to claim 9, wherein the compound of iron and nitrogen is $Fe_{16}N_2$ or $Fe_8N$.

11. The method according to claim 8, wherein the heat treatment in the subjecting is held at from 600° C. to 1200° C. for 24 hours or less.

12. The method according to claim 8, wherein the rapidly cooling is performed at a cooling rate of less than 100° C./s.

13. The method according to claim 8, wherein the annealing is performed at from 100° C. to 200° C., for 24 hours or less, and at a tensile stress of 100 MPa.

* * * * *